United States Patent
Lekutai

(10) Patent No.: US 7,239,881 B2
(45) Date of Patent: Jul. 3, 2007

(54) CUSTOMIZED SIGNATURE MESSAGING SERVICE

(75) Inventor: Gaviphat Lekutai, Kirkland, WA (US)

(73) Assignee: Cingular Wireless II LLC, Atlanta, GA (US)

(*) Notice: Subject to any disclaimer, the term of this patent is extended or adjusted under 35 U.S.C. 154(b) by 259 days.

(21) Appl. No.: 10/881,672

(22) Filed: Jun. 30, 2004

(65) Prior Publication Data

US 2006/0003779 A1    Jan. 5, 2006

(51) Int. Cl.
- *H04Q 7/20*   (2006.01)
- *H04M 1/00*   (2006.01)
- *H04M 11/00*  (2006.01)
- *H04M 1/66*   (2006.01)
- *H04B 1/38*   (2006.01)

(52) U.S. Cl. ............... 455/466; 455/410; 455/456.1; 455/456.3; 455/456.5; 455/456.6; 455/550.1; 455/556.2; 455/561; 455/406

(58) Field of Classification Search .. 455/456.1–456.6, 455/405–411, 401, 412.1, 412.2, 414.1, 414.4, 455/415, 466, 418–421, 550.1, 457–458, 455/432.1–432.3, 435.1, 435.2, 461, 463, 455/556.1, 556.2, 557–561, 566, 422.1, 452.2, 455/512–517, 403, 404.2; 370/328–333, 370/395.43, 310, 313, 338, 349; 713/179–182, 713/176–177; 380/247–250

See application file for complete search history.

(56) References Cited

U.S. PATENT DOCUMENTS

| | | | |
|---|---|---|---|
| 6,175,743 B1 * | 1/2001 | Alperovich et al. | 455/466 |
| 6,240,091 B1 | 5/2001 | Ginzboorg et al. | |
| 6,381,465 B1 | 4/2002 | Chern et al. | |
| 6,459,904 B1 | 10/2002 | Lorello et al. | |
| 6,505,052 B1 | 1/2003 | Jou | |
| 6,584,323 B1 | 6/2003 | Son | |
| 6,590,887 B1 | 7/2003 | Lee | |
| 6,611,516 B1 | 8/2003 | Pirkola et al. | |
| 6,625,460 B1 | 9/2003 | Patil | |
| 6,625,461 B1 | 9/2003 | Bertacchi | |
| 6,671,818 B1 * | 12/2003 | Mikurak | 714/4 |
| 6,681,111 B2 | 1/2004 | Ahn et al. | |
| 7,113,781 B1 * | 9/2006 | Allison et al. | 455/432.1 |
| 2002/0002032 A1 * | 1/2002 | Fleenor | 455/3.03 |
| 2002/0159600 A1 * | 10/2002 | Weiner | 380/270 |
| 2004/0018847 A1 * | 1/2004 | Chang | 455/466 |
| 2004/0106396 A1 * | 6/2004 | Segura et al. | 455/414.1 |
| 2004/0198380 A1 * | 10/2004 | Unmephopa | 455/456.1 |
| 2004/0203615 A1 * | 10/2004 | Qu et al. | 455/412.1 |
| 2004/0248599 A1 * | 12/2004 | Lai et al. | 455/466 |

* cited by examiner

*Primary Examiner*—Meless Zewdu
(74) *Attorney, Agent, or Firm*—Amin, Turocy & Calvin, LLP

(57) ABSTRACT

Architecture that facilitates the broadcast of a custom signature message to one or more portable wireless devices that enter an associated area of coverage. A subscriber to the service pays a premium to have the rights to broadcast the custom message to all users who enter and/or leave the cell. The rights can be exclusive for a coverage area over an extended period of time. For example, a company can subscribe to broadcast a single message to all wireless users who enter a cell for a period of one year. Subscriber account information includes quality-of-service (QoS) data that indicates the highest level of service such that when a wireless device is detected as entering the cell, only the subscriber's message will be broadcast to all users for a brief time.

39 Claims, 10 Drawing Sheets

| CELL ID | SUBSCRIBER | QoS | MESSAGE |
|---|---|---|---|
| 1000 | SUBSCRIBER1 | HIGHEST | "WELCOME TO MY WORLD!" + COLORS |
| 1002 | SUBSCRIBER2 | HIGHEST | "ALL VEHICLES AT BELOW LIST!!" + MUSIC |
| 1004 | SUBSCRIBER1 | HIGHEST | "GETTING CLOSER TO MY HOME" + ANIMATION |
| 1008 | SUBSCRIBER3 | HIGHEST | "IN REMEMBRANCE OF JOHN F. KENNEDY" |
| 1010 | SUBSCRIBER4 | HIGHEST | "WELCOME TO MY WORLD!" + AUDIO |
| 1012 | ⋮ | | |
| ⋮ | | | |

CUSTOMIZED SIGNATURE MESSAGING SERVICE

TECHNICAL FIELD

This invention is related to wireless messaging systems, and more specifically, to customized wireless messaging in an area of coverage.

BACKGROUND OF THE INVENTION

Wireless portable communication devices have become ubiquitous in everyday communications, whether the device is a cellular telephone, personal digital assistant (PDA), or simple messaging device, to name just a few. Cellular telephones are the mobile communications device of choice for which evolve an ever-increasing number of enhancements and services. Thus, competition for cellular users and the associated services is very competitive. Companies are continually striving to find more ways in which to leverage existing devices and systems for minimal cost.

One technology employed is messaging. Messaging can be accomplished according to several different technologies, including but not limited to SMS (Short Messaging Service) and the more advanced MMS (Multimedia Messaging Service). Using these technologies, companies can provide added value to existing and new telephones that allow users to generate and transmit short messages to another's mobile device.

However, what is needed is another way in which existing telecommunications infrastructure and devices can be leveraged at a modest cost.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention disclosed and claimed herein, in one aspect thereof, comprises architecture that facilitates the broadcast of a custom signature message to one or more portable wireless devices that enter an associated area of coverage, for example, a cell. A subscriber to the service pays a premium to have the rights to broadcast the custom message to all users who enter and/or leave the cell. The rights can be exclusive for a coverage area over an extended period of time. For example, a company can subscribe to broadcast a single message to all wireless users who enter a cell for a period of one year.

Subscriber account information includes quality-of-service (QoS) data that indicates the highest level of service such that when a wireless device is detected as entering the cell, only the subscriber's message will be broadcast to all users for a brief time.

One function of the signature service can be for marketing. Another function includes vanity advertising (in accordance with a fashion trend) where the subscriber simply alerts a user that the service is paid for by a certain user. Another function is for the entertainment to be able to provide a personal signature to the phone as a user enters (and/or departs) the cell.

In support thereof, there is provided a system that facilitates the transmission of a customized message to a portable wireless device. The system further comprises a subscriber service component that stores the customized message in association with account data of a subscriber. A detection component detects a signal property of the portable wireless device in a cell site. A signaling component transmits the customized message to the portable wireless device in response to the signal property.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention may become apparent from the following detailed description of the invention when considered in conjunction with the drawings.

DETAILED DESCRIPTION OF THE INVENTION

Figure 1:
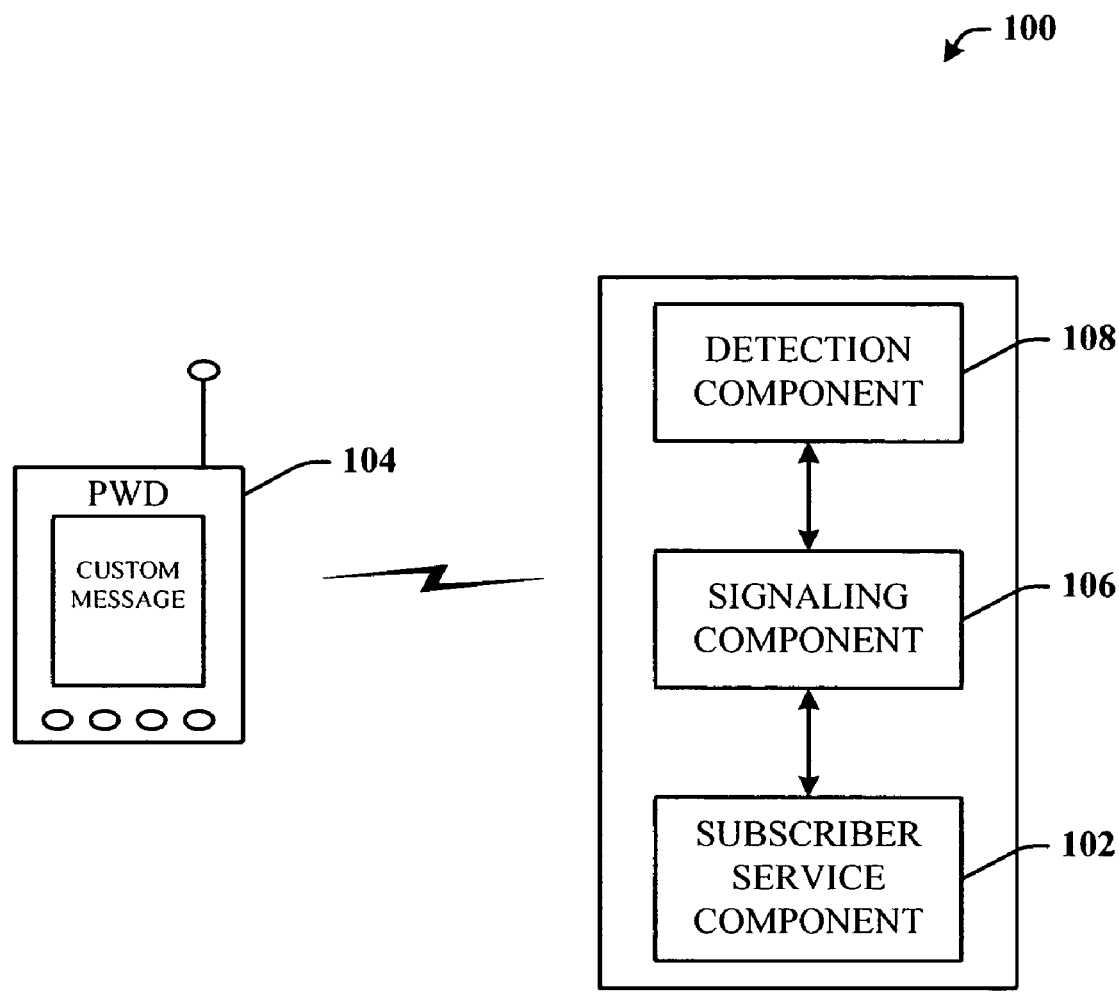
FIG. 1 illustrates a block diagram of a system in accordance with the present invention.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running in a mobile computing device and the mobile computing device can be a component. One or more components may reside within a process and/or thread of execution and a component may be localized on one computer and/or distributed between two or more computers.

As used herein, the term to "infer" or "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Referring now to FIG. 1, there is illustrated a block diagram of a system 100 in accordance with the present invention. The system 100 facilitates a customized signature message service in a personal area of coverage. The signature message service provides a subscriber an opportunity to "own" and broadcast his or her customized coverage signature (or message) in a given area of coverage, and provide priority quality of service (QoS). For example, consider that Mr. Jones signed up for the service. When Mr. Jones or any other wireless user brings their wireless device into an associated cell site, a customized message can be broadcast to the wireless device for presentation, such as "Welcome to Mr. Jones' neighborhood." Note that a cell is an area covered by a base transceiver station (BTS). A cell may sectorise its antennas to service several cells from one location. The process of converting a single cell to multiple cells is called cell splitting. Such a process facilitates provisioning additional custom messages to subscribers. In accordance with the QoS aspects of the invention, any other user who enters the cell site can still use the service to make calls, but Mr. Jones' signature message will have the highest broadcast priority. Mr. Jones will be charged a premium for this customized messaging service, for example, monthly or annually.

In support thereof, there is provided a subscriber service component 102 that stores the subscriber information in accordance with the signature messaging service. In one implementation, the subscriber is allowed a single message to be broadcast to a portable wireless device (PWD) 104 of a user that enters the cell site. A signaling component 106 interfaces to the service component 102 to receive messaging data therefrom, and process the message data for transmission to a wireless device of a recipient that enters the cell site. Note that the signature component 102 is not restricted to broadcasting the signature message in only the English language, but can broadcast the message in any language desired. Moreover, the signature component 102 can broadcast the signature message in a plurality of different languages at the same time according the particular recipient users and/or user devices. A detection component 108 is provided to detect when a portable wireless device enters the cell site. The detection component 108 interfaces to the signaling component 106 to trigger the signaling component 106 to then retrieve the appropriate message from the service component 102 for transmission to the recipient device. It is to be appreciated that the detection component 108 and the signaling component 106 can be a single component that handles both functions.

In another implementation, the subscriber is allowed multiple messages for broadcast. That is, a first message is transmitted followed by a second message, and a third, etc.

In yet another embodiment, the service provider allows a rotating messaging system whereby a same (or a different) message is allowed to be automatically transmitted on a periodic time basis, for example, a month. This can include any number of customized messages. Thus, for example, a first message can be transmitted during a first month, a second message can be transmitted during a second month, the first message can be transmitted during the third month, and so on.

In still another implementation, the signal strength of the portable device 104 can be measured such that as the signal weakens from the device 104, the system determines that the device 104 may be leaving the cell site. Hence, a "departure" message can then be broadcast. For example, "Thank you for visiting my personal coverage area!" It is to be appreciated that any number and/or type of departure messages can be transmitted to the device 104.

In another implementation, the type (or format) of message that is transmitted can be based upon the type of wireless device to which the message will be transmitted. For example, the detection component 108 can detect that the wireless device 104 has entered the cell site, and also the type of device. If the type of device, as determined by transmitted unique device information, has a reduced display size such that transmission of the message in the default format would render the message unreadable on the current device (e.g., cause clipping of information) an alternative message can be transmitted that conveys the same or similar content, but that is rendered as viewable on the wireless device display in a more presentable manner.

The disclosed invention can also be applied to an event such that all event visitors with suitable portable wireless device capabilities can be messaged when entering within a cell site associated with the event. For example, if there is an automobile convention being held in a city, and there are expected to be many visitors, such visitors can be apprised that once they enter the cell site associated with the location of the convention a message will be transmitted to their portable wireless devices.

In another implementation, only those registered attendees will be signaled with the message when they enter the cell site. When the prospective attendee provides registration information, the registration can include the name and device information such that although all portable wireless devices will be detected by the detection component 108 when entering the cell site, information retrieval from the service component 102 can only be presented to registered attendees.

In still another implementation, the system can facilitate honorary or commemorative signaling for a small fee or at no cost. For example, a free signature service can be provided for the cell site that covers the location of President John F. Kennedy in honor of his past presidency. Along with the welcome message, a short description can be provided of his profile and location of a nearby museum. Such an implementation can be linked to a holiday or special day such that the system automatically overrides, as part of a service agreement, the existing signature message during one or more days or time periods that are normally associated with the honorary or commemorative event.

In another application, the innovation of the present invention can be applied to highway messaging systems. For example, a customized signature message can be sent to travelers that forewarn of traffic hazards, congestion, and/or construction, and provide messaging that routes travelers around or away from the hazard, congestion and/or construction. Moreover, as a user or groups of users move through one or more cells, which can then define a general direction of travel for that user(s), messaging can be sent to that user(s) that provides traffic information in the general direction of travel that the user might find useful. This also applies to weather information for the same use(s) who are determined to be traveling through a cell or cells.

It is to be appreciated that these are but only a few examples of the capabilities for providing custom signature messaging in accordance with the present invention. Other applications include, by way example, but not by limitation, applications such as advertisement for businesses, nearby conventions directions, games such as treasure hunt clues, a love message to someone, and so on.

Figure 2:
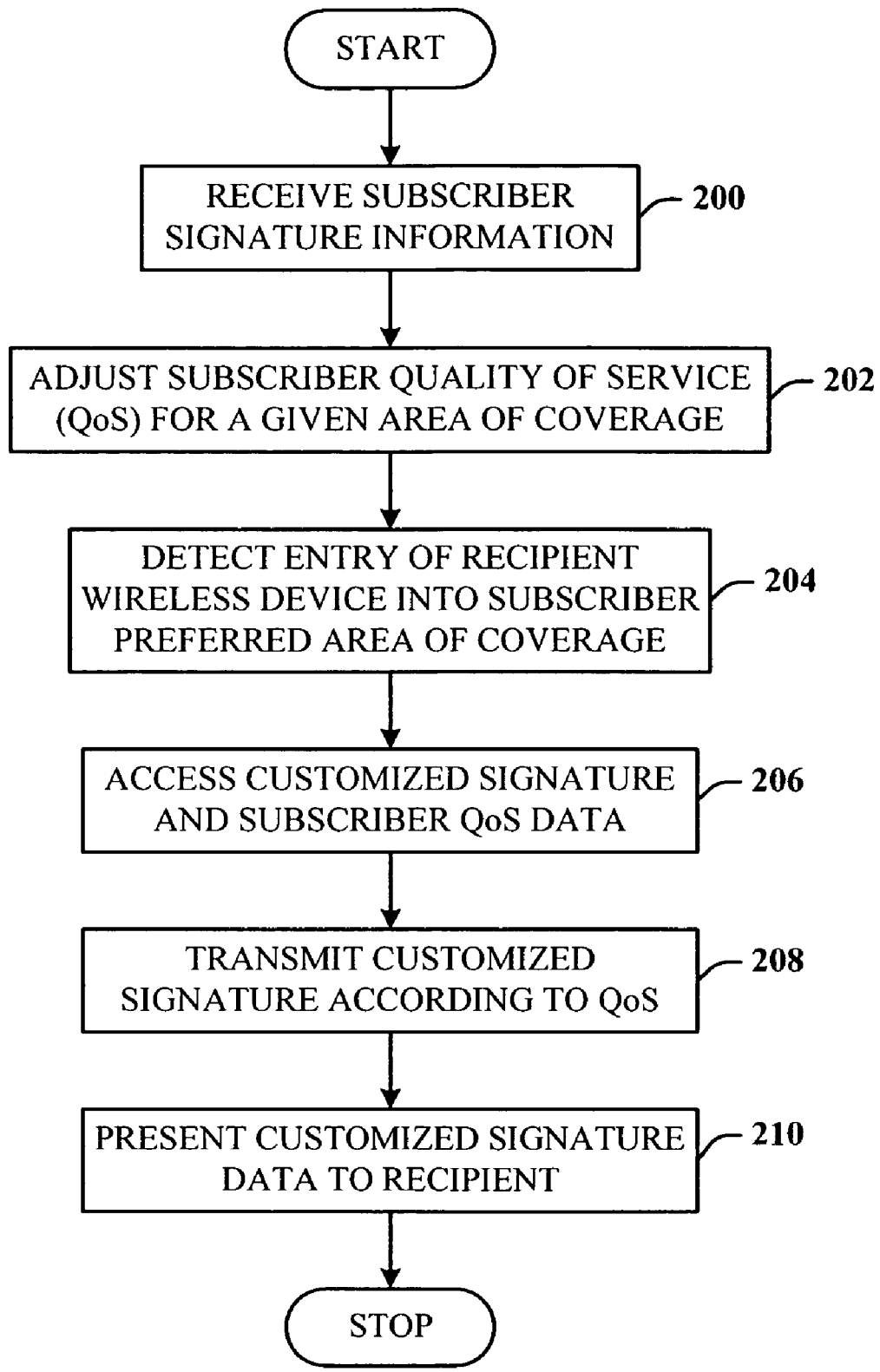
FIG. 2 illustrates a flow chart of one methodology for customized signature messaging in accordance with the present invention.

Referring now to FIG. 2, there is illustrated a flow chart of one methodology for customized signature messaging in accordance with the present invention. While, for purposes of simplicity of explanation, the one or more methodologies shown herein, e.g., in the form of a flow chart, are shown and described as a series of acts, it is to be understood and appreciated that the present invention is not limited by the order of acts, as some acts may, in accordance with the present invention, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the present invention.

At 200, a subscriber subscribes to the service, and provides one or more customized signatures for broadcast in the cell site. The subscriber information also includes the QoS information for the message. Preparation of the subscriber information includes assigning a cell site ID that is close to the customer-preferred area of coverage (or cell site) to the message and other subscriber information. It is to be appreciated that were multiple messages are accommodated, each message can be associated with a particular QoS parameter. Thus, while a first message may be given higher priority in the cell site, a second message of the same subscriber may be given a lower level of priority in the cell site based upon the associated QoS information.

At 202, the messaging service provider adjusts the QoS information for the subscriber for a given area of coverage (or cell site) (e.g., set in RNC (Radio Network Controller) for UMTS (Universal Mobile Telecommunications System)). At 204, the detection component detects a new portable wireless device entering the cell site. In response thereto, at 206, the signaling component triggers retrieval of the custom message from the service component. This can occur by the cell site ID being used to find the associated custom message for broadcast in the cell site. At 208, the custom message is transmitted in the cell site according to the QoS information using BCCH (Broadcast Control Channel), SMS (Short Message Service), or MMS (Multimedia Messaging Service). MMS is an evolution of SMS that goes beyond text messaging by offering various kinds of multimedia content including images, audio, and video clips. At 210, the message is presented to the user of the portable wireless device. The process then reaches a Stop block.

In another implementation, multiple cell sites are employed to broadcast corresponding customized messages. For example, if a user has to travel through two cell sites to reach a location in a third cell site, customized messages can be employed in the first two cell sites to provide information related to the local cell site.

Figure 3:
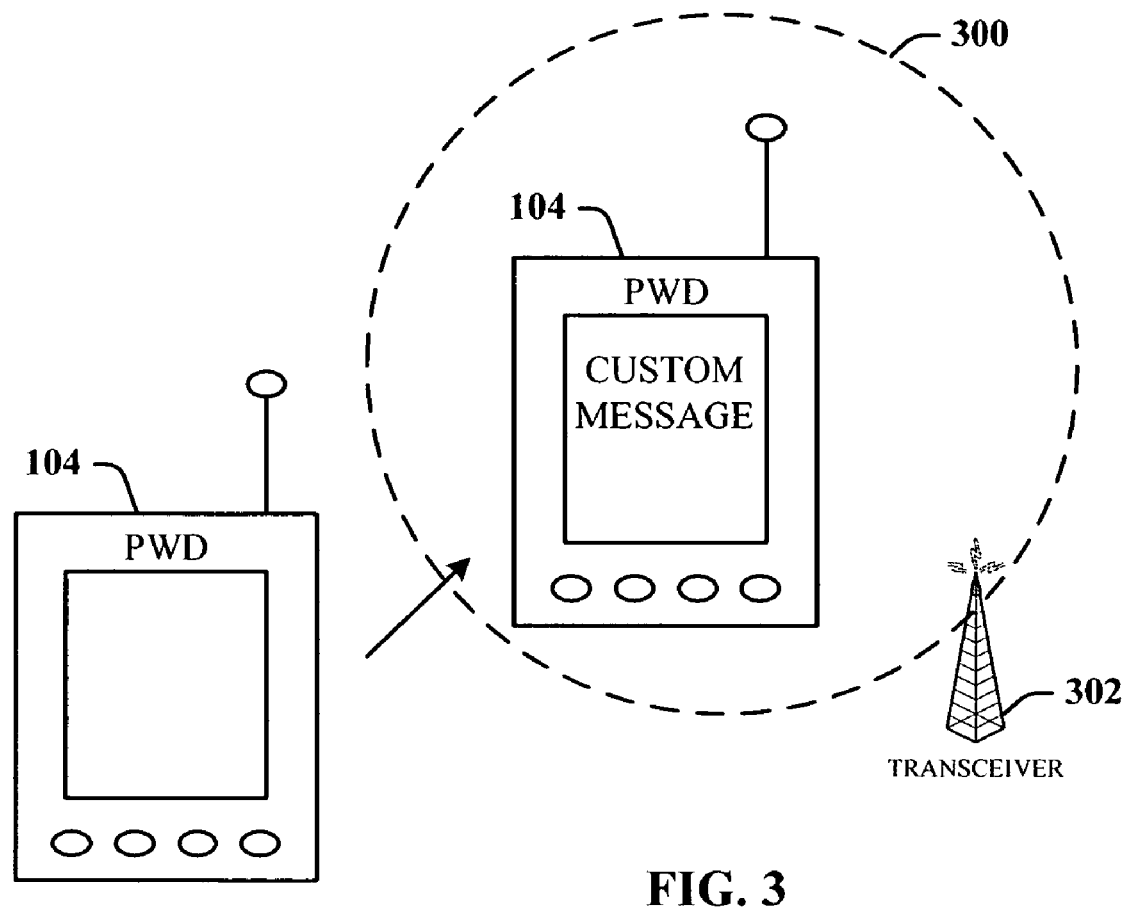
FIG. 3 illustrates a diagram representative of one aspect of the present invention.

Referring now to FIG. 3, there is illustrated a diagram representative of one aspect of the present invention. The portable wireless device 104, whose display, in one instance, is not displaying any information related to the customized messaging architecture of the present invention, is carried into a cell site 300. A cellular transmitter 302 facilitates detection and signaling such that a customized message "CUSTOM MESSAGE" is automatically retrieved, transmitted, and displayed on the device 104 to the device user when in the cell site 300.

Figure 4:
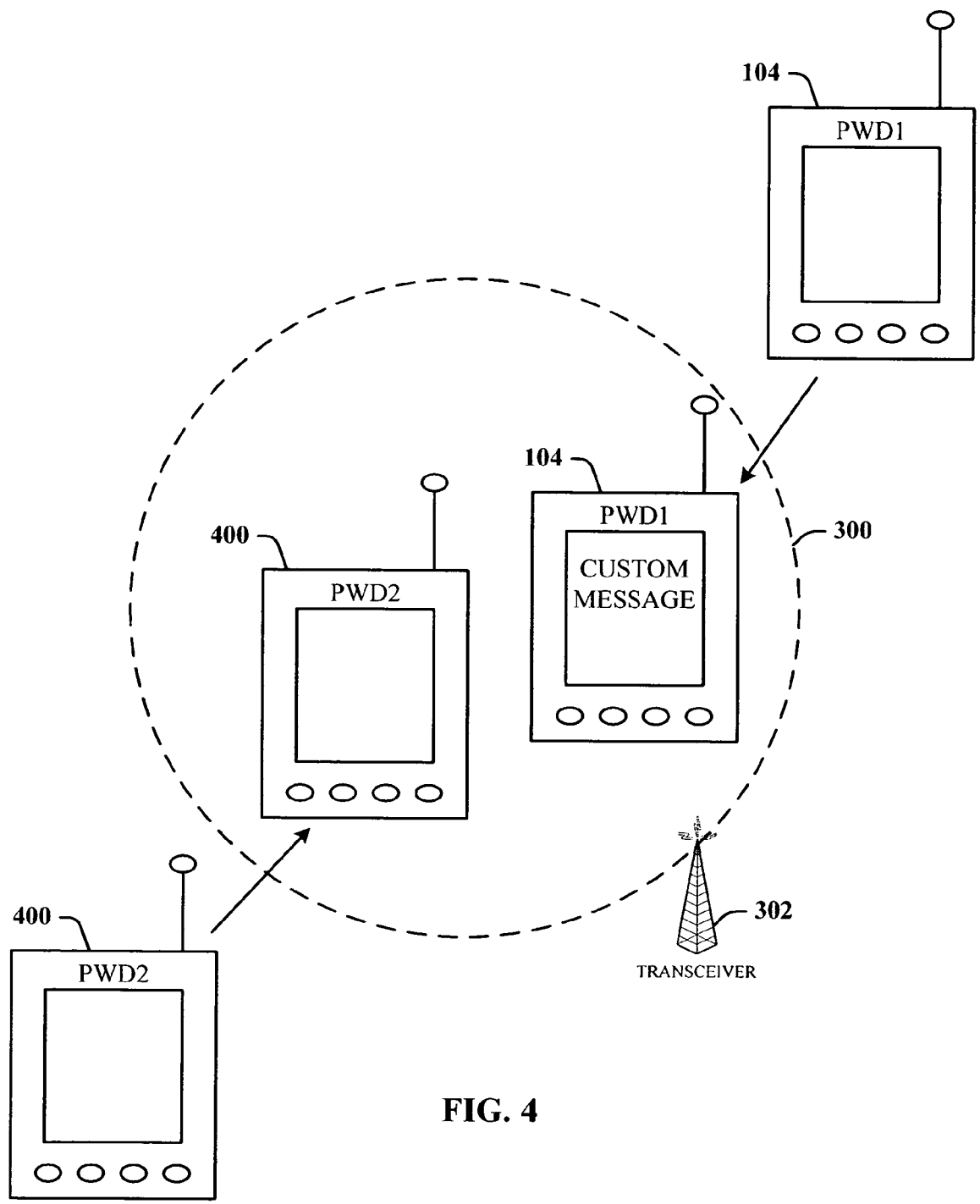
FIG. 4 illustrates a diagram representative of one aspect of the present invention.

Referring now to FIG. 4, there is illustrated a diagram representative of one aspect of the present invention. Here, not all portable wireless devices that enter the cell site 300 will receive the message. The device 104 behaves as in FIG. 3, by receiving and displaying the customized message. However, a second device (PWD2) 400 that enters the cell site 300 does not present the custom message. This feature can be introduced in a number of ways. For example, unique device information such as a multibit ESN (Electronic Serial Number), an IMEI (International Mobile Equipment Identity) and/or an IMSI (International Mobile Subscriber Identity) can be included that allows the device to receive only those messages directed to it. Where many users are involved, each user device would be registered in the service component such that the custom message can only be processed and presented by selected recipient devices.

Figure 5:
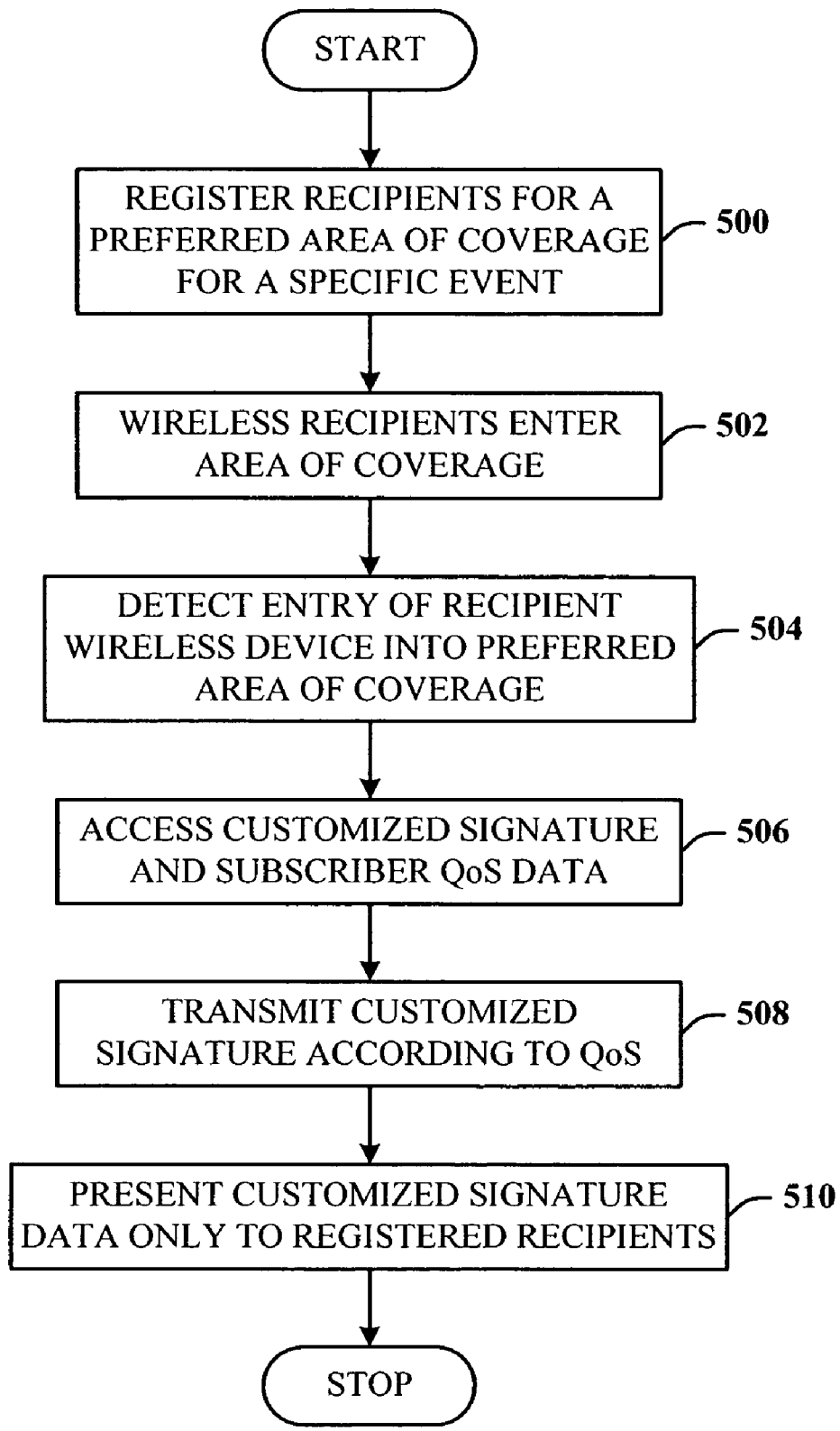
FIG. 5 illustrates a flow chart of one implementation where only registered attendees of an event are signaled in accordance with the present invention.

Referring now to FIG. 5, there is illustrated a flow chart of one implementation where only registered attendees of an event are signaled in accordance with the present invention. At 500, attendees register for the event, and device information of each attendee is recorded for later use. This attendee information is then associated to a specific cell site. At 502, one or more attendees enter the cell site with their wireless devices. At 504, the devices are detected in the cell site. At 506, the subscriber custom signature message is accessed along with the QoS data. At 508, the customized signature message is transmitted to the attendee devices, and according to the QoS data. At 510, the message is presented only by the devices of the registered attendees. The process then reaches a Stop block.

Figure 6:
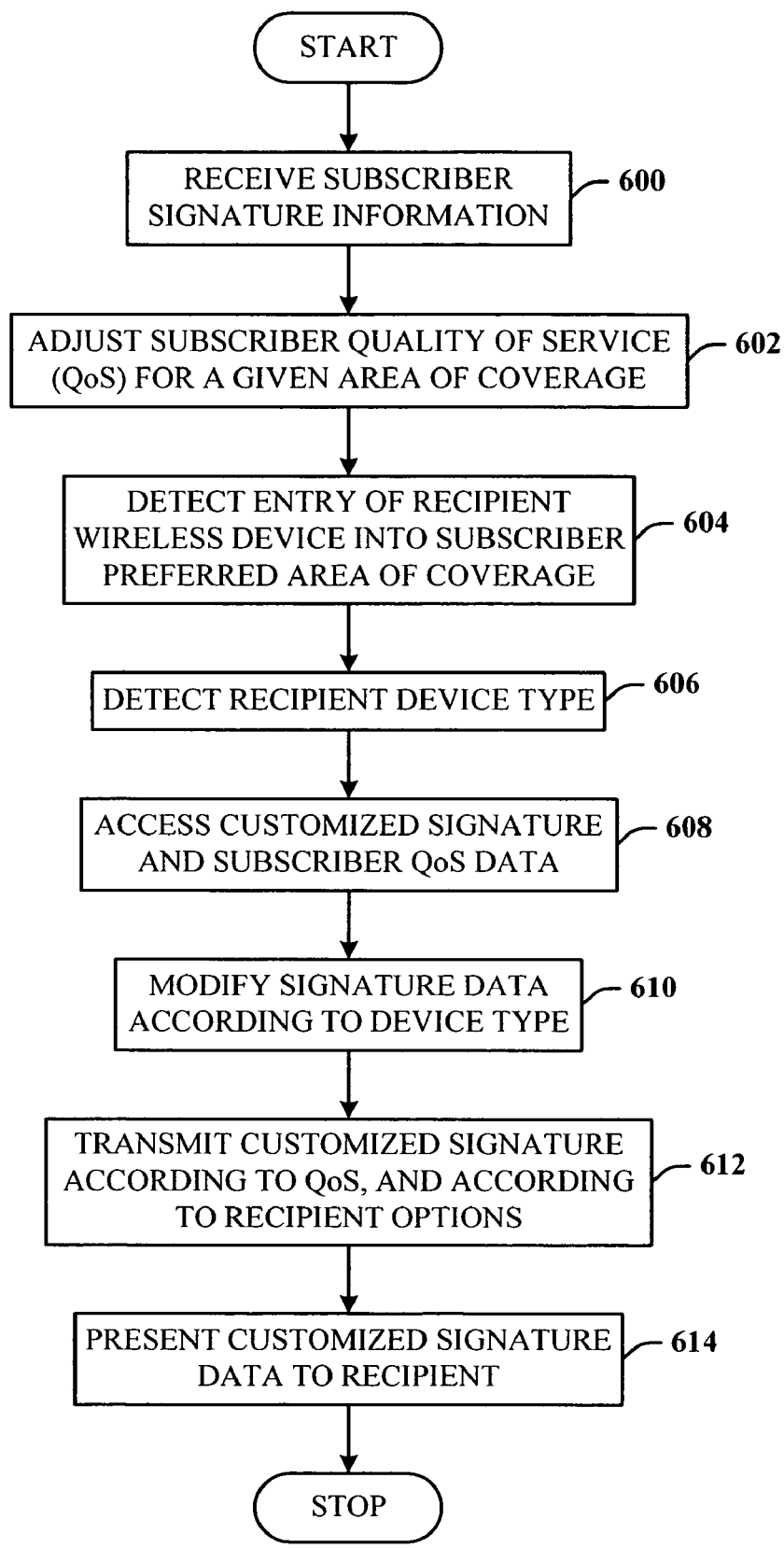
FIG. 6 illustrates a flow chart of one methodology for processing custom signature messages for a given device type, in accordance with the present invention.

Referring now to FIG. 6, there is illustrated a flow chart of one methodology for processing custom signature messages for a given device type, in accordance with the present invention. At 600, subscriber signature information is received into the messaging system. At 602, the existing subscriber QoS information, if any, is adjusted accordingly to provide that the custom signature message is broadcast to all devices that enter the associated cell site. At 604, the entry of one or more wireless devices into the cell site is detected. At 606, the type of device type for each detected wireless device is determined. At 608, the subscriber custom signature message and QoS information is accessed. At 610, given the particular device type, the signature message will be modified accordingly. For example, if the device normally includes a smaller display, the font size of the message can be reduced to more effectively present the message. In yet another example, the message can be complimented with an audio signal (e.g., voice and music) that replicates the message in an audio format. In still another example, a message enhancement to the message text can include animation to the text, text color changes, and so on. In a more robust implementation, video and/or image content can be used to augment the message, such as for background information. Thus, it is to be appreciated that many different combinations or types of multimedia information can be used to convey the message and supplement the message. At 612, the message is transmitted to the wireless devices according to subscriber QoS data, and according to the recipient options. It is to be appreciated that the recipient may choose to not receive such custom messages when moving through cell sites. Thus, the recipient can select an option on the device that disables such messaging. Alternatively, according to a recipient selection, such messaging could be automatically routed to the recipient's mailbox for later perusal. At 614, the message is then presented to the recipient on the recipient device. The process then reaches a Stop block.

Figure 7:
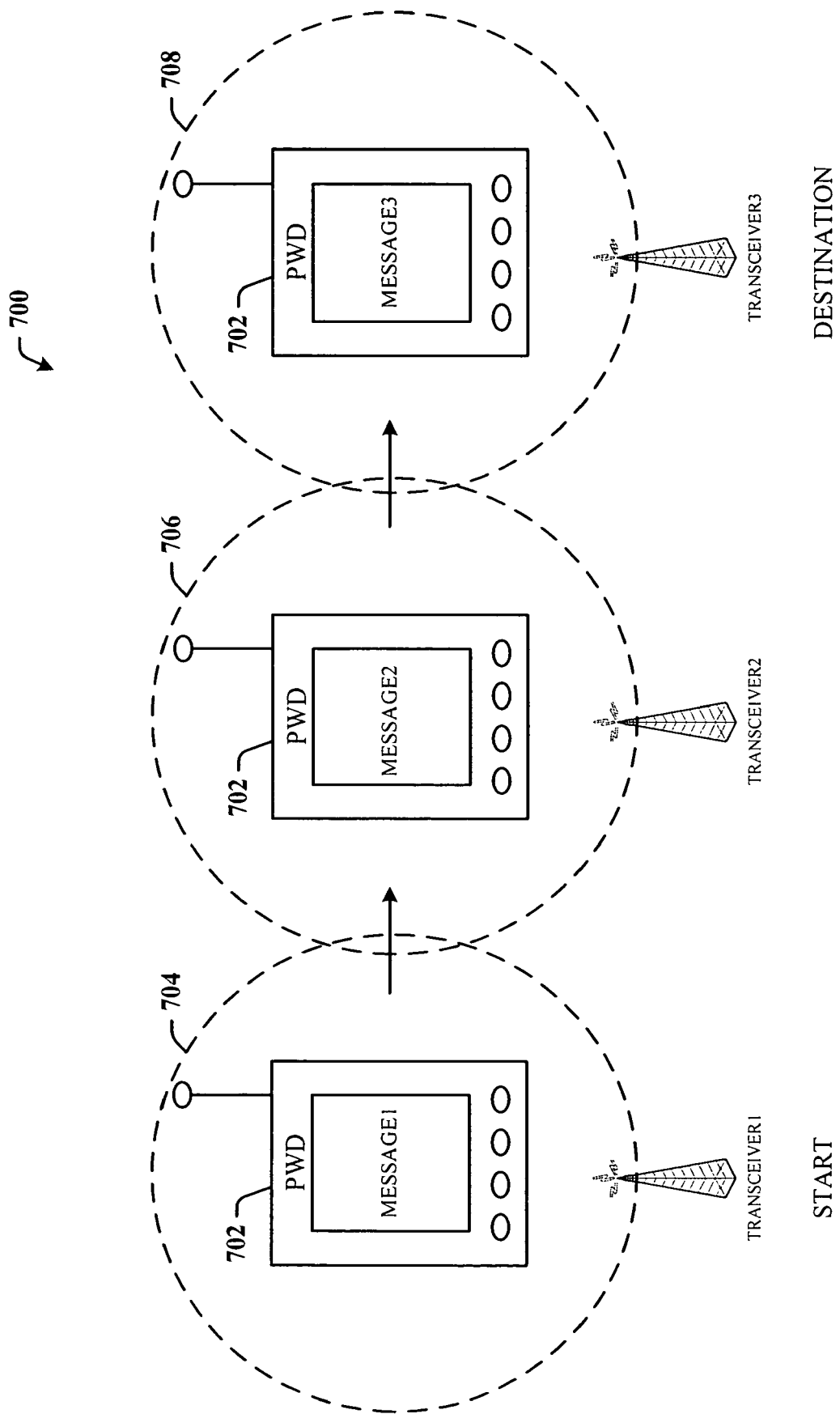
FIG. 7 illustrates a system where signature messaging in accordance with the present invention is applied to a multi-cell implementation.

Referring now to FIG. 7, there is illustrated a system 700 where signature messaging in accordance with the present invention is applied to a multi-cell implementation. A subscriber subscribes to a service that provides and coordinates messaging among many cell sites. The system is suitably robust to store multiple same or different messages for retrieval, transmission, and presentation on the same wireless device 702 (similar to device 104) as the device 702 move into and out of different cell sites 704, 706, and 708. Here, cell site 704 can be a first site (a starting cell) into which the user moves. In accordance with the subscriber messaging and QoS data, a first message (MESSAGE1) is broadcast and presented on the device 702. As the user leaves the first cell 704 and enters the second cell 706, a second message (MESSAGE2) is retrieved, transmitted, and presented on the device 702. When the user enters the third (or destination) cell 708, a third message (MESSAGE3) is retrieved, transmitted, and presented on the device 702. It is to be appreciated that, again, the format and presentation used, e.g., multimedia, can be combined with the signature message when presented to the recipient.

The implementation of FIG. 7 finds widespread application to commercial business where users who may be traveling can receive messages related to products or advertising as they pass through different cell sites. Of course, the businesses would be charged a premium for such a feature in order to capture the attention of potential customers.

The system of FIG. 7 can also be used for events as attendees travel toward the geographic location, to provide directions, offers, or other information.

Figure 8:
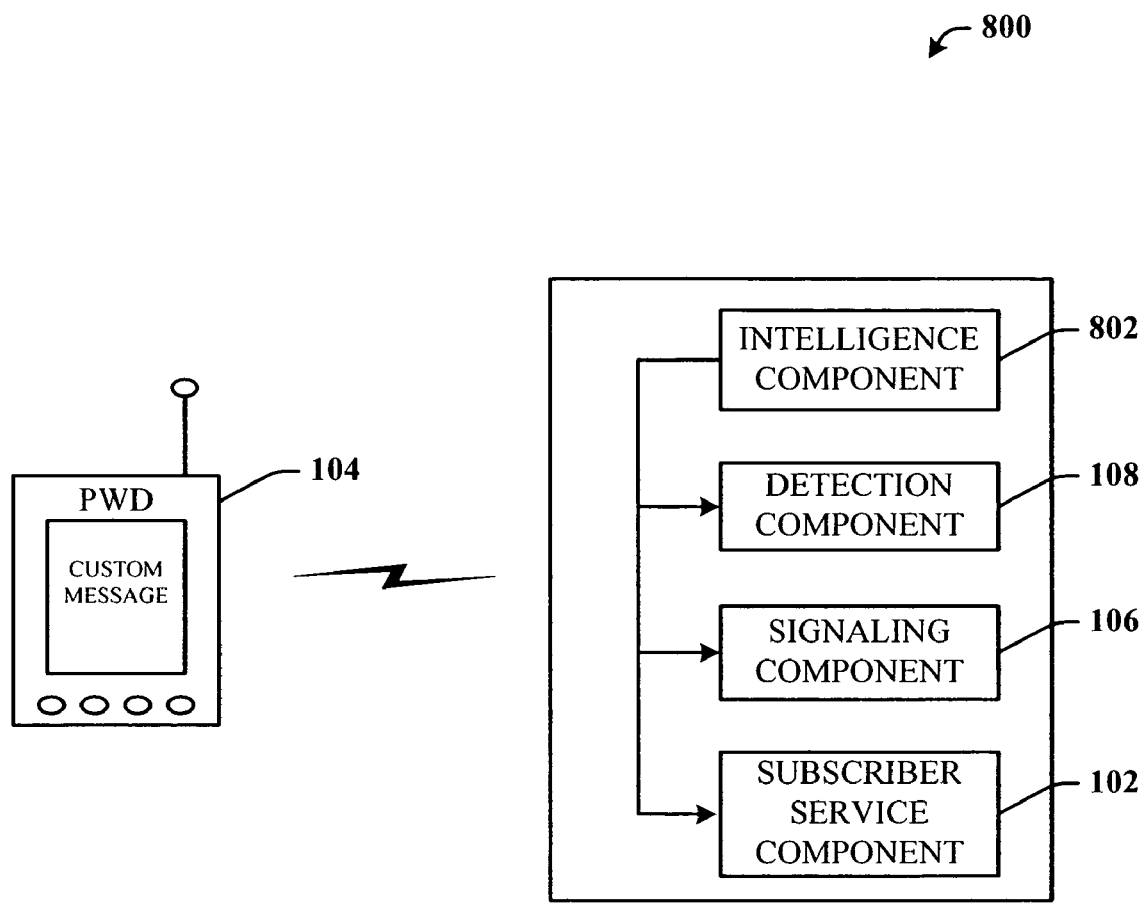
FIG. 8 illustrates a system that employs an intelligence component that automates one or more features in accordance with the present invention.

Referring now to FIG. 8, there is illustrated a system 800 that employs an intelligence component 802 that automates features in accordance with the present invention. For example, given that a subscriber of the signature messaging architecture of the present invention can subscribe to the service for extended periods of time (e.g., a one year subscription) for a premium charge, the parameters associated with messaging can be altered according to any number of factors, e.g., time of day, seasonal changes, emergency related events, product roll-outs of the subscriber, personal events such as birthdays, holidays, and so on. The system can be configured to trigger on such events and send predetermined messaging in response to such triggering events.

Where the system can determine recipient response to such messaging, by the recipient turning off their device in response to perceiving a given message, the intelligence component 802 can learn from this response to automatically move to a different message, which different message is one that is designed to draw a more positive response from the recipients. This sort of implementation can be more affiliated with advertising by a commercial enterprise that subscribes to the architecture of the present invention.

The subject invention can employ various artificial intelligence based schemes for carrying out various aspects thereof. For example, a process for determining when to switch to a different message can be facilitated via an automatic classifier system and process. Moreover, where the user response to a certain message is measured to be negative, the classifier can be employed to determine which next message to employ.

A classifier is a function that maps an input attribute vector, $x=(x1, x2, x3, x4, xn)$, to a confidence that the input belongs to a class, that is, $f(x)=confidence(class)$. Such classification can employ a probabilistic and/or statistical-based analysis (e.g., factoring into the analysis utilities and costs) to prognose or infer an action that a user desires to be automatically performed.

A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naive Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated from the subject specification, the subject invention can employ classifiers that are explicitly trained (e.g., via a generic training data) as well as implicitly trained (e.g., via observing user behavior, receiving extrinsic information). For example, SVM's are configured via a learning or training phase within a classifier constructor and feature selection module. Thus, the classifier(s) can be used to automatically perform a number of functions, including but not limited to determining according to a predetermined criteria what message to transmit, what multimedia content to add to a message, when to introduce a new message, when to go back to a previous message, when to alter the message for a given recipient device because of potential perception difficulties based on capabilities of the recipient device, bow to limit the content (e.g., the length of a text message), the rotation of various messaging per a given time period, and so on. Thus, it is to be appreciated that the intelligence component 802 can be used to automate many more features and content then described herein, the entirety of which is fully contemplated by the present invention.

Figure 9:
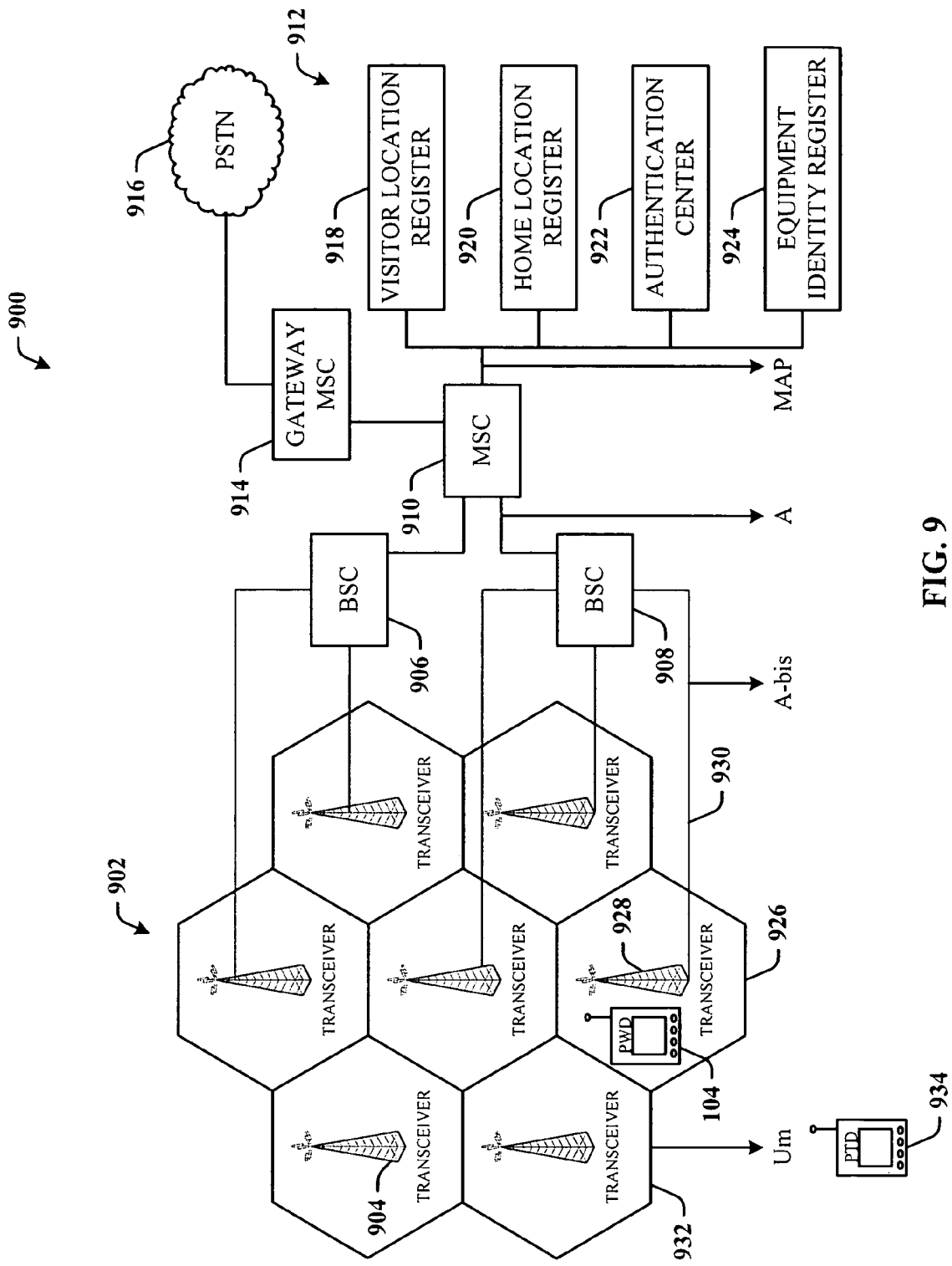
FIG. 9 illustrates a block diagram of a digital cellular system that facilitates signature messaging in accordance with the present invention.

Referring now to FIG. 9, there is illustrated a block diagram of a digital cellular system 900 that facilitates signature messaging in accordance with the present invention. The system 900 includes a number of cells (or cell sites) 902 each of which is serviced by a base transceiver station (BTS) 904. Since there are a number of cells and BTS's, one or more base station controllers (BSC's) (906 and 908) are employed to control a group of the BTS's 904. The BSC's (906 and 908) feed into a mobile switching center (MSC) 910 that interfaces to a group of databases 912 that enable roaming, billing, and interconnection. The MSC 910 interfaces to a gateway MSC 914 that passes on the relevant billing information so that the service provider can produce subscriber invoices. The gateway MSC 914 then interfaces to the PSTN (Public Switched Telephone Network) 916 to communicate the information. It is to be appreciated that the PSTN 916 is a robust set of communication software and hardware that supports multimedia communications as understood by one skilled in the art.

The disclose invention is not limited to GSM/GPRS technologies, but can be implemented with any current and future technologies. For example, with respect to WCDMA (Wideband Code Division Multiple Access, another name for UMTS—Universal Mobile Telecommunications System) 3G technologies, the BTS is called "Node B" and the BSC is called RNC. However, there are major functionality difference, none of which impact implementation of the present invention.

The databases 912 include, but are not limited to, a visitor location register 918 that stores information about calls being made by roaming subscribers and periodically forwards information to the subscriber's home service providers for billing and other purposes. Each MSC 910 can have a visitor location register database. A home location register 920 provides information about subscribers in a particular switching center-controlled area. An authentication center database 922 protects the subscriber from unauthorized access, provides security features including encryption, customer identification, etc., and is associated with the home location register 920. The home location register 920 also stores signature information of a subscriber, and cell ID information related to one or more of the cells 902. An equipment identity register 924 registers the mobile equipment types and maintains a database of equipment that has been stolen or blacklisted for some reason.

In operation, once a user brings the portable wireless device 104 into a cell 926, for example, of the cells 902, the transceiver 928 communicates with the device 104 and detects its presence. Generally, the system 900 then operates detect the cell ID of the cell 926, and use the cell ID to access the subscriber signature information from the home location register 920. The signature message information stored in association with the home location register 920 is retrieved and transmitted through the MSC 910 to the BSC 908 on a BCCH link 930 to the transceiver 928, which broadcasts the signature message to the portable wireless device 104 for presentation to the device user. The BCCH link 930 is the logical channel used in cellular networks to broadcast signaling and control information to all mobile phones within the network. As indicated previously, as the device 104 moves through any of the cells 902, a similar operation occurs such that the same or different message can be accessed and presented.

The system 900 also supports interfacing any cell transceiver, for example, of a cell 932 to a GSM (Global System for Mobile Communications) network (not shown), as indicated by the air interface symbology Um to a GSM terminal 934. The BSC 908 can interface to a transceiver of the GSM network (not shown) via the interface denoted as A-bis. The MSC 910 can interface to a base station system/subsystem of the GSM network via an A interface. A MAP (Mobile Application Part) output, which is a user part of the SS7 (Signaling System 7) protocol is used in wireless mobile telephony. MAP standards address roaming and intersystem hand-off procedures. MAP is a query-response procedure that makes use of TCAP (Transaction Capabilities Application Part) over the SS7 network.

Figures 10, 11:
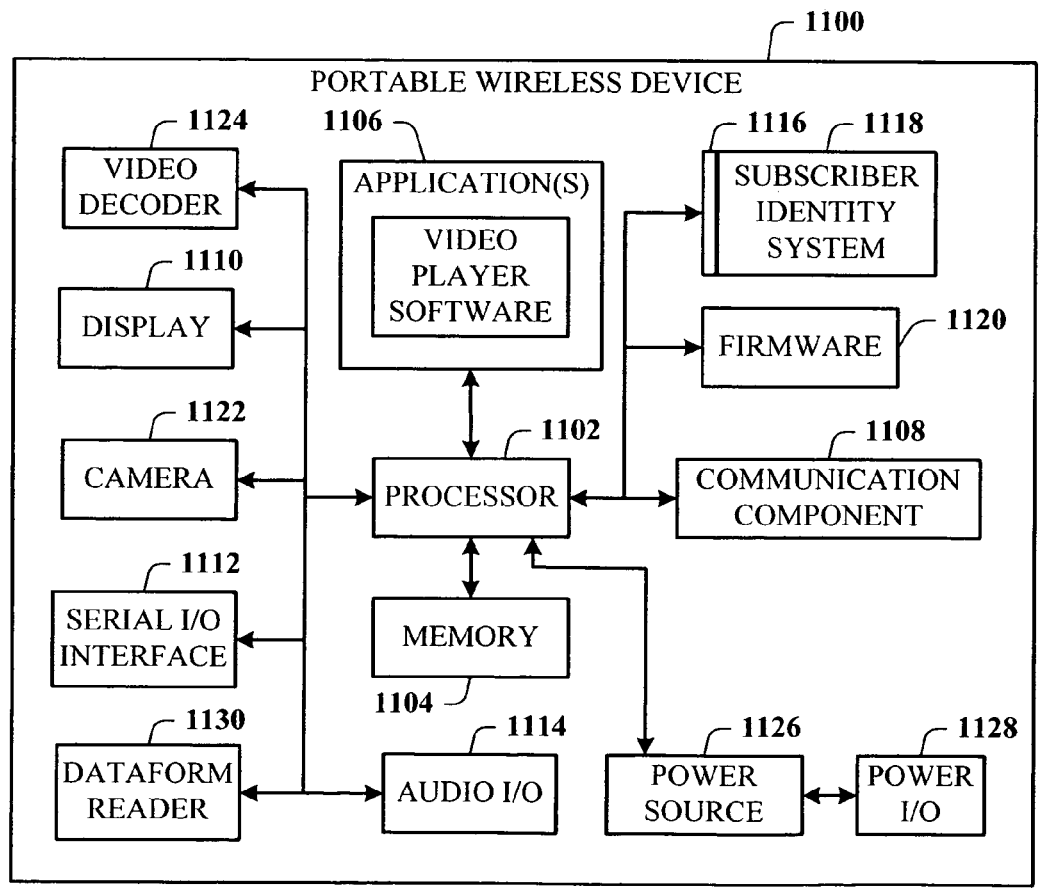
FIG. 10 illustrates a sample database of fields that represent a relationship of subscriber account data in accordance with signature messaging in accordance with the present invention.
FIG. 11 illustrates a block diagram of the portable wireless device suitable for accommodating signature messaging in accordance with the present invention.

Referring now to FIG. 10, there is illustrated portions of a sample home location registry database 1000 in accordance with the present invention. The registry 1000 includes at least a cell ID column, a subscriber column, a QoS column and custom signature messages. When the PWD enters a cell, a cell ID is transmitted for comparison with subscriber account information. The cell ID is associated with a certain message with or without enhancements. As illustrated, the cell with the cell ID of 1000 was purchased by a first subscriber (denoted SUBSCRIBER1), and whose associated QoS data is set to the highest level. The message to be broadcast to all devices entering the cell is "Welcome to my world! Additionally, the message will use color enhancements. The first subscriber also purchased broadcast services for a cell ID of 1004. A different message will be broadcast to all users entering the area of coverage. The message is related to automobile sales where the message is something on the order of "All vehicles at below list!" Additionally, music will be transmitted along with the text, or the text is in the words of the music.

A fourth subscriber (denoted SUBSCRIBER4) has purchased signal services for a cell ID that is 1010. Here, the message is "Welcome to my world!" and accompanied by audio data, which audio data can be the same text message put to voice.

As can be seen, many variations of multimedia can be employed to convey the desire message. Although not shown, it is to be appreciated that a single cell (e.g., cell 1000) can have more than one message assigned there to by a single user or multiple users of corresponding periods of time. For example, where the subscriber is a commercial entity, this can be an advertisement transmitted for presentation to the wireless recipient. Moreover, there can be many different messages associated with the cell 1000 that are transmitted according to a predetermined order or frequency. Where the same subscriber has purchased more than one cell, different messages can be processed through the subscribed cells according to a predetermined manner, e.g., in a sequence, interleaved, etc.

Referring now to FIG. 11, there is illustrated a block diagram of the portable wireless device 1100 operable to receive custom signature messaging in accordance with the present invention. The PWD 1100 includes a processor 1102 for controlling and processing all onboard operations and functions. A memory 1104 interfaces to the processor 1102 for temporary storage of data and one or more applications 1106 (e.g., a video player software) in a firmware 1120, and being executed by the processor 1102. The firmware 1106 also stores startup code for execution in initializing the PWD 1100. A communication component 1108 interfaces to the processor 1102 to facilitate wired/wireless communication with external systems.

The PWD 1100 includes a display 1110 for displaying text, images, and video related to signature messaging, and telephony functions, for example, a Caller ID function and a setup function, and for user input. The display 1110 can also accommodate the presentation of multimedia content. A serial I/O interface 1112 is provided in communication with the processor 1102 to facilitate serial communication (e.g., USB, and/or IEEE 1394) via a hardwire connection, and other serial input devices (e.g., a keyboard, keypad, and mouse). This supports updating and troubleshooting the PWD 1100, for example. Audio capabilities are provided with an audio I/O component 1114, which can include a speaker for the output of audio signals related to, for example, a custom signature message, recorded data or telephony voice data, and a microphone for inputting voice signals for recording and/or telephone conversations.

The PWD 1100 includes a slot interface 1116 for accommodating a SIC (Subscriber Identity Component) in the form factor of a card Subscriber Identity Module (SIM) 1118, and interfacing the SIM card 1118 with the processor 1102. However, it is to be appreciated that the SIM 118 can be manufactured into the PWD 1100, and updated by downloading data thereinto.

The PWD 1100 can process IP data traffic via the communication component 1108 to accommodate IP traffic from an IP network such as, for example, the Internet, a corporate intranet, a home network, a person area network, etc., via an ISP or cable provider. Thus, VoIP traffic can be utilized by the PWD 1100, and IP-based multimedia content can be received in either an encoded or a decoded format.

A video processing component 1122 (e.g., a camera) can be provided for decoding encoded multimedia content. The LBS 1100 also includes a power source 1126 in the form of batteries and/or an AC power subsystem, which power source 1126 interfaces to an external power system or charging equipment (not shown) via a power I/O component 1128.

The PWD 1100 can also include a dataform reader 1130 suitably designed to read many types of dataforms. For example, the reader 1130 can scan product bar codes for two and three dimensions, and other types of indicia.

Aspects of the invention described above may be stored or distributed on computer-readable media, including magnetic and optically readable and removable computer discs, as well as distributed electronically over the Internet or over other networks (including wireless networks). Those skilled in the relevant art will recognize that portions or embodiments of the invention may reside in a fixed element of a communication network, while corresponding portions may reside on a mobile communication device. Data structures and transmission of data particular to aspects of the invention are also encompassed within the scope of the invention.

The disclosed invention finds application to EDGE (Enhanced Data rates for GSM Evolution) technology. EDGE is effectively the final stage in the evolution of the GSM standard, and uses a new modulation schema to enable theoretical data speeds of up to 384 kbps within the existing GSM spectrum. EDGE is an alternative upgrade path towards 3G services for operators, without access to a new spectrum.

The architecture of the present invention also finds application to a hierarchical cell structure (HCS). HCS is the architecture of a multi-layered cellular network where subscribers are handed over from a macrocell to a microcell, and even further, to a picocell, depending on the current network capacity and the needs of the subscriber What has been described above includes examples of the present invention. It is, of course, not possible to describe every conceivable combination of components or methodologies for purposes of describing the present invention, but one of ordinary skill in the art may recognize that many further combinations and permutations of the present invention are possible. For example, the disclosed invention can be provided in any wireless device or card such as a PDA, and a wireless air card. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system that facilitates the transmission of a customized message to a portable wireless device, comprising:
    a subscriber service component that stores the customized message in association with account data of the portable wireless device;
    a detection component that detects the presence of the portable wireless device in a cell site; and
    a signaling component that transmits the customized message to the portable wireless device according to broadcast priority determined from a quality-of-service (QoS) parameter in response to detection of the portable wireless device where the customized message is an entry message when the portable wireless device is entering the cell site and the customized message is a departure message when the portable wireless device is leaving the cell site.

2. The system of claim 1, the portable wireless device is one of a cellular telephone, a person digital assistant, and a wireless air card.

3. The system of claim 1, the portable wireless device is a short message service (SMS) device.

4. The system of claim 1, the customized message is broadcast to all devices that enter a specific cell site.

5. The system of claim 1, the customized message is broadcast for a given period of time.

6. The system of claim 1, a user of the portable wireless device can manually disable reception of the customized message.

7. The system of claim 1, further comprising a subscriber service component that stores the customized message, and from which the customized message is retrieved for transmission to the portable wireless device when brought into a cell site associated with the customized message.

8. The system of claim 1, the portable wireless device is a portable computing device.

9. The system of claim 1, the customized message is transmitted only to a subset of a plurality of the portable wireless devices that enter an associated cell site.

10. The system of claim 1, further comprising an intelligence component that employs a probabilistic and/or statistical-based analysis to prognose or infer an action that a user desires to be automatically performed.

11. The system of claim 1, the customized message includes at least one of text, text enhancements, audio, video, and an image.

12. The system of claim 1, the customized message is modified according to a type of the portable wireless device on which the message will be presented.

13. The system of claim 1, the customized message is one of a plurality of different customized messages each of which is associated with a different cell site, such that as the portable wireless device enters a given cell site, one of the different customized messages is transmitted thereto.

14. The system of claim 1, the customized message is broadcast in any language and/or abbreviated text message.

15. The system of claim 1 is employed by a wireless technology.

16. A system that facilitates the transmission of a customized message to a portable wireless device, comprising:
    a subscriber service component that stores the customized message in association with account data of a subscriber, the account data includes at least one of the customized message, a cell site ID and quality-of-service (QoS) data;
a detection component that detects a signal property of the portable wireless device in a cell site; and
a signaling component that transmits the customized message to the portable wireless device according to broadcast priority determined from the QoS data in response to the signal property where the customized message is an entry message when the portable wireless device is entering the cell site and the customized message is a departure message when the portable wireless device is leaving the cell site.

17. The system of claim 16, further comprising an intelligence component that employs a probabilistic and/or statistical-based analysis to prognose or infer an action that a user desires to be automatically performed.

18. The system of claim 17, the action includes at least one of disabling reception of the customized message and filtering multimedia components of the customized message to receive the customized message in a predefined format.

19. The system of claim 16 is a cellular telephone communication system.

20. The system of claim 16 is an SMS communication system.

21. The system of claim 16 is a multimedia messaging service (MMS) communication system.

22. A method of providing customized messaging to a portable wireless device, comprising:
associating a customized message with account data of the portable wireless device, the account data includes at least one of the customized message, a cell site ID and quality-of-service (QoS) data;
detecting signal properties of the portable wireless device in a cell site;
accessing the quality-of-service (QoS) data associated with the cell site;
transmitting a customized message to the portable wireless device in accordance with broadcast priority related to the QoS data for presentation to a user thereof based on the signal properties;
analyzing the signal properties to transmit the customized message as an entry message when the portable wireless device enters the cell site; and
analyzing the signal properties to transmit the customized message as a departure message when the portable wireless device begins to leave the cell site.

23. The method of claim 22, further comprising broadcasting the customized message to all portable wireless devices in the cell site.

24. The method of claim 22, further comprising rotating through a plurality of the customized messages, each of which is different, the act of rotating based on a time parameter.

25. The method of claim 22, further comprising adjusting a QoS parameter in order to transmit the customized message.

26. The method of claim 22, further comprising managing reception of the customized message at least one of manually and automatically.

27. The method of claim 22, further comprising,
storing the customized message in a subscriber account database; and
retrieving the customized message when a cell ID is determined.

28. The method of claim 22, further comprising transmitting the customized message only to a registered wireless device of a registered user who enters the cell site.

29. The method of claim 22, the customized message is related to a subscriber account of at least one of a business and a private individual.

30. The method of claim 22, further comprising formatting the customized message according to a type of the portable wireless device, the message formatted according to at least one of font, text enhancements, audio, video, and an image.

31. A method of providing customized messaging to a portable wireless device, comprising:
associating a customized message with a cell ID;
detecting signal properties of the portable wireless device in a cell;
analyzing the signal properties to transmit the customized message where the customized message is an entry message when the portable wireless device enters the cell site and a departure message when the portable wireless device begins to leave the cell site;
accessing quality-of-service (QoS) data related to the customized message; and
transmitting the customized message to the portable wireless device according to broadcast priority related to the QoS data.

32. The method of claim 31, the customized message is one of a plurality of different customized messages each of which is associated with a different cell site, such that when the portable wireless device enters a given cell site, one of the different customized messages is transmitted thereto for presentation to a user of the device.

33. The method of claim 31, further comprising disabling presentation of the customized message at least one of manually and automatically.

34. The method of claim 31, further comprising filtering attributes of the customized message based at least upon the type of portable wireless device to which the customized message is transmitted.

35. The method of claim 31, further comprising rendering the customized message on the portable wireless device according to at least one of hardware and software parameters of the portable wireless device.

36. The method of claim 31, further comprising transmitting a sequence of related customized messages to the portable wireless device as the portable wireless device moves through a plurality of corresponding cells.

37. The method of claim 31, further comprising transmitting customized messaging related to at least one of advertising, an honorary event, directions, and personalized data.

38. The method of claim 31, the customized messaging is compatible with at least one of an SMS and an MMS technology.

39. A system that facilitates transmission of a signature message to a mobile communications device, comprising:
means for associating the signature message with a cell ID;
means for detecting the presence of the mobile communications device in a cell site, and transmit an entry message when the mobile communications device enters the cell site and transmit a departure message when the communications device begins to leave the cell site;
means for detecting the cell ID of a cell in which the mobile communications device resides;
means for retrieving the signature message;

means for access quality-of-service (QoS) data related to the signature message;
means for transmitting the signature message to the mobile communications device according to broadcast priority related to the QoS data; and means for presenting the signature message to a user of the mobile communications device.

* * * * *